US005240216A

United States Patent [19]

Lin et al.

[11] Patent Number: 5,240,216

[45] Date of Patent: Aug. 31, 1993

[54] UNIVERSAL ANGLED FLAG BRACKET FOR USE WITH TRACKS FOR SECTIONAL OVERHEAD DOORS

[75] Inventors: Tony Y. Lin, Mason; James R. York, Versailles; Mark W. Westerfield, Cincinnati, all of Ohio

[73] Assignee: Clopay Corporation, Cincinnati, Ohio

[21] Appl. No.: 705,088

[22] Filed: May 24, 1991

[51] Int. Cl.$^5$ .............................................. F16M 13/00

[52] U.S. Cl. .................................... 248/300; 248/558; 248/544; 16/94 R; 160/201

[58] Field of Search ............... 248/300, 558, 911, 912, 248/544; 160/201, 207, 213; 16/94 K; 49/199, 200

[56] References Cited

U.S. PATENT DOCUMENTS

| | | | |
|---|---|---|---|
| 1,346,895 | 7/1920 | Johnson | 248/906 X |
| 2,032,636 | 3/1936 | Seckinger | 248/906 X |
| 2,271,309 | 1/1942 | Rowe | 16/94 X |
| 2,937,837 | 5/1960 | Johnson | 248/300 X |
| 2,991,496 | 7/1961 | Wolf et al. | 16/94 R |
| 3,162,148 | 12/1964 | Ganz | 248/221.2 X |
| 3,555,750 | 1/1971 | Banse | 248/300 X |
| 4,033,531 | 7/1977 | Levine | 248/558 |
| 4,141,525 | 2/1979 | Miller | 248/251 |
| 4,232,845 | 11/1980 | Turner | 248/222.1 X |
| 4,465,256 | 8/1984 | Wolbrink et al. | 248/544 |
| 4,817,907 | 4/1989 | Cougan | 248/558 |

FOREIGN PATENT DOCUMENTS

| | | | |
|---|---|---|---|
| 2045044 | 9/1970 | Fed. Rep. of Germany | 248/558 |
| 2229278 | 11/1974 | France | 248/300 |

*Primary Examiner*—Alvin C. Chin-Shue

*Attorney, Agent, or Firm*—Wood, Herron & Evans

[57] ABSTRACT

Novel angled flag brackets for use with tracks for sectional overhead garage doors are disclosed. The novel angled flag brackets of the present invention are uniquely designed to permit the vertical and horizontal tracks to be uniquely adjusted in both vertical and horizontal directions at the time of assembly and installation so that the assembled and installed tracks will be plumb, level or square. The novel angled flag brackets further permit end bearing plates of torsion spring systems to be directly mounted thereto when door jambs are too short so that the end bearing plates will not remain free-standing following installation. Still further, the novel angled flag brackets of the instant invention are uniquely designed so that each is suitable for use with substantially all standard size tracks, such as those having either 10 inch, 12 inch or 15 inch horizontal track radiuses and adapted to receive $1\frac{3}{8}$ inch, $1\frac{3}{4}$ inch or 2 inch thick doors, thereby significantly reducing the number of brackets manufacturers must carry in their inventories and package.

6 Claims, 3 Drawing Sheets

UNIVERSAL ANGLED FLAG BRACKET FOR USE WITH TRACKS FOR SECTIONAL OVERHEAD DOORS

FIELD OF THE INVENTION

The present invention relates to universal angled flag brackets for connecting horizontal and vertical tracks of sectional overhead type garage doors to one another and for connecting the tracks to supports, such as door jambs of suitable door frames provided in walls of, for instance, buildings or vehicles.

BACKGROUND

Horizontal and vertical tracks for sectional overhead type garage doors are typically mounted to jambs of suitable frames provided in walls of buildings or vehicles by angled flag brackets. Examples of angled flag brackets commercially available hitherto include Duo Dec and Universal Dec, distributed by Arrow Tru Line, Inc., Archbold, Ohio, Vertical Flag Angle, distributed by Napoleon Spring Works, Inc., Archbold, Ohio, and Vertical Splice Angle and Slotted Decorator, distributed by Collier Industries, Inc., Collier, W.Va.

Even though the above-mentioned angled flag brackets are currently used to mount the tracks to jambs, they are not without drawbacks. First of all, manufacturing imperfections in the horizontal and vertical tracks or in the frames may prevent the tracks from being properly aligned to be plumb or square or level when connected to one another and/or mounted to the jambs. Horizontal or vertical adjustments may therefore be required in order to align the tracks when connecting one to the other or when mounting the tracks to the jambs. Unfortunately, the angled flag brackets available heretofore do not permit the tracks to be adjusted in both horizontal and vertical directions. The manufacturers of sectional overhead type garage doors and frames are therefore required to carry and package both types of brackets to cover both situations even though only vertical or horizontal adjustment may be required at the time of assembly and installation. It goes without saying that this drawback adds to the cost and number of inventory items that the manufacturers must carry and package. Moreover, in those instances when the door frames do not lie square or the manufacturing imperfections in the tracks require both vertical and horizontal adjustments, the angled flag brackets currently available are inadequate since they provide for only vertical or horizontal adjustment, but not both.

Second, the angled flag brackets currently available are typically designed for use with a particular standard size track that can accommodate either $1\frac{3}{8}$ inch, $1\frac{3}{4}$ inch, or 2 inch thick doors and that has either a 10 inch, 12 inch, or 15 inch horizontal track radius. In other words, the thicknesses of the doors and the radiuses of the horizontal tracks determine which of the angled flag brackets available heretofore must be selected and packaged with these components. Again, this lack of versatility between the angled flag brackets available hitherto requires the manufacturers of sectional overhead type garage doors to increase the number of items that they must carry in their inventories. Moreover, it adds potential complexities and confusion as to packaging since the right size and number of angled flag brackets must be packaged with the right tracks and doors.

Third, there are situations when the end bearing plates, to which the cable drums of sectional overhead type garage doors are mounted, must remain free-standing because the door jambs of the doors frames are too short. This is undesirable since the torque from the torsion springs may twist the end bearing plates from lateral movements. Because of the design of the current angled flag brackets, the end bearing plates are not mounted to the angled flag brackets. Thus, even when the angled flag brackets available up to now are employed to connect the tracks to one another and mount the tracks to shortened door jambs, the end bearing plates are left free-standing.

Consequently, there is a demand in the sectional overhead door industry for an angled flag bracket which permits tracks to be adjusted in both vertical and horizontal directions at the time of installation, which is suitable for use with substantially all standard size tracks, and which can permit end bearing plates to be mounted thereto in those situations where the supports, such as door jambs, are too short, thereby significantly reducing the number of items the manufacturers of sectional overhead garage door systems must carry in their inventories and package.

SUMMARY OF THE INVENTION

In brief, the present invention alleviates and overcomes the above-mentioned drawbacks and shortcomings of the present state of the art through the discovery of a novel universal angled flag bracket for use with tracks for sectional overhead type garage doors, such as extension spring and torsion spring garage doors. Generally speaking, the novel angled flag brackets of the instant invention are uniquely designed to permit both horizontal and vertical adjustments of the horizontal and vertical tracks when connecting one to the other and mounting same to supports, such as the door jambs, of door frames. Moreover, each novel angled flag bracket of the present invention is uniquely designed to work with substantially all standard size tracks, such as those that can accept, for example, $1\frac{3}{8}$ inch, $1\frac{3}{4}$ inch, or 2 inch thick doors and that have 10 inch, 12 inch, or 15 inch horizontal track radiuses. Still further, the novel angled flag brackets of the instant invention are uniquely designed so that the end bearing plates can be mounted thereto when torsion spring overhead door systems are being installed to door jambs of door frames that are too short so that the end bearing plates will not remain free-standing following installation.

More particularly, an angled flag bracket of the instant invention is provided which is preferably formed from sheet metal. The bracket has first and second plate portions that lie perpendicular to each other and a flag portion connected to the first plate portion which lies parallel to the first plate portion to which it is connected, but perpendicular to the second plate portion. The first plate portion to which the flag portion is connected is provided preferably with three sets of two large parallel rectangular slots which lie in a series. The three sets of two large parallel rectangular slots run parallel to the second plate portion. Moreover, the three sets of two large parallel rectangular slots uniquely permit the angled flag brackets of the instant invention to be used with substantially all standard sized tracks such as those having 10 inch, 12 inch or 15 inch horizontal radiuses and designed to accept $1\frac{3}{8}$ inch, $1\frac{3}{4}$ inch or 2 inch thick sectional doors. Thus, a user may now uniquely rely upon single size left and right angled flag brackets to assemble and install either a 10 inch, 12 inch, or 15 inch standard horizontal track radius designed to accept either a $1\frac{3}{8}$ inch, $1\frac{3}{4}$ inch, or 2 inch standard thick door.

The three sets of two large parallel rectangular slots of the novel angled flag brackets of the instant invention further permit adjustment in the horizontal and vertical directions of the horizontal tracks when mounting the horizontal tracks to the door jambs via the horizontal angles and the angled flag brackets. In addition, if necessary, the top set of the two large parallel rectangular slots in the first plate portion uniquely permits a user, when installing tracks for use with a torsion spring garage door system to a door jamb which is too short, to mount the end bearing plate to the angled flag bracket so that the end bearing plate does not remain free-standing.

The second plate portion is preferably provided with a plurality of smaller oval slots which are spaced from one another at selected distances and run perpendicular to the first plate portion. The smaller oval slots permit a user to mount the angled flag brackets to structures, such as door jambs, of door frames via suitable fasteners.

The flag portion of an angled flag bracket of the instant invention is provided with two large parallel oval slots which are spaced apart from one another at a selected distance and run perpendicular to the second plate portion. The flag portion is further provided with preferably three round holes that lie in a series preferably between the two large parallel oval slots and likewise run perpendicular to the second plate portion. The flag portion is further provided with three smaller oval slots that lie in a series preferably between the round holes and one of the large elongated oval slots, but which run perpendicular to the two large parallel oval slots. The large and smaller slots and round holes in the flag portion permits a user, for example, a user installing either a 10 inch, 12 inch, or 15 inch horizontal track radius designed to accept either a $1\frac{3}{8}$ inch, $1\frac{3}{4}$ inch, or 2 inch thick garage door, to adjust the tracks in both the horizontal and vertical directions when connecting the vertical and horizontal tracks to one another and mounting same to door jambs of door frames via the angled flag brackets. More particularly, the two large oval slots in the flag portion permit adjustment of the tracks in a horizontal direction whereas the smaller oval slots in the flag portion permit adjustment of the tracks in the vertical direction when connecting the tracks to one another and mounting same to a door jamb via the flag portion of an angled flag bracket of the present invention.

Accordingly, it can now be appreciated by those versed in this art that the novel angled flag brackets of the instant invention provide a solution to the sectional overhead door art that has sought to overcome the shortcomings associated with angled flag brackets available hitherto. That is, the angled flag brackets of the present invention are uniquely designed to work with substantially all standard size tracks for sectional overhead doors, thereby significantly reducing the number of brackets manufacturers must carry in their inventories and package, to permit both horizontal and vertical adjustment of the horizontal and vertical tracks at the time of assembly and installation so that the tracks will lie plumb, level or square, and to permit, if necessary, end bearing plates of torsion spring systems to be mounted to the angled flag brackets when the door jambs are too short so the end bearing plates will not remain free-standing following installation.

The above and other features and advantages of the instant invention, including various novel details of design will be more particularly described with reference to the FIGS. and detailed description and pointed out in the claims. It should be understood that the angled flag brackets embodying the present invention are shown by way of illustration only and are not meant to limit the invention. It should be further understood that the principles and features of the instant invention may be employed in various and numerous embodiments without departing from the scope of the present invention.

DESCRIPTION OF THE FIGURES

Reference is now made to the accompanying FIGS. in which are shown illustrative embodiments of the instant invention from which its novel features and advantages will be apparent.

DETAILED DESCRIPTION OF THE INVENTION

By way of illustrating and providing a better appreciation of the present invention and many of the attendant advantages thereof, the following detailed description is given concerning the universal angled flag brackets.

The brackets of the present invention are formed as a one-piece unitary left or right member preferably formed by bending die stamped sheet metal galvanized 6-60 steel of ±13 gauge. Alternatively, the plate and flag members may be joined by welding or the bracket may be formed from aluminum, suitable engineering plastic or the like. The brackets may be plated, for example, chrome-plated, or may be painted. It should be understood that while a right angled flag bracket is depicted in the FIGS., a left angled flag bracket of the instant invention is simply a mirror image of the right.

Figure 1:
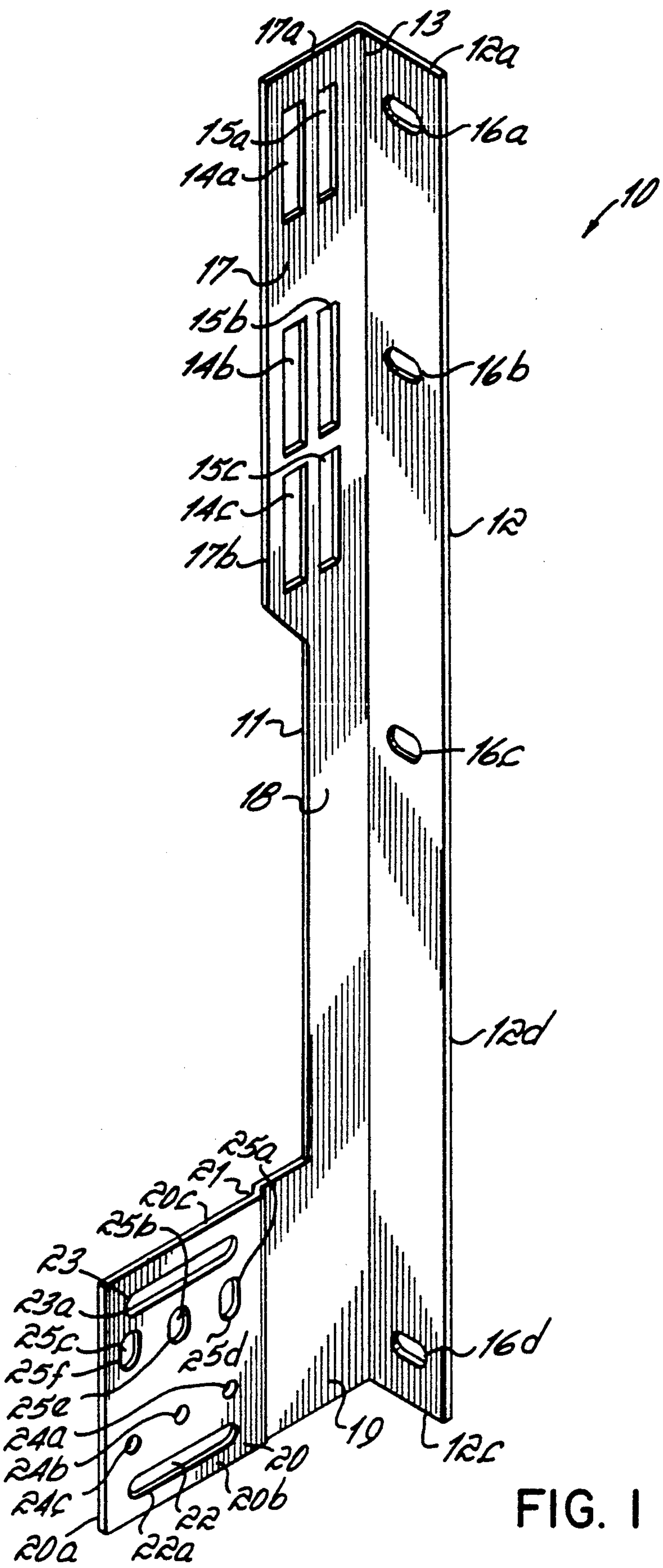
FIG. 1 is a perspective view of a right universal angled flag bracket of the instant invention.
Figure 2:
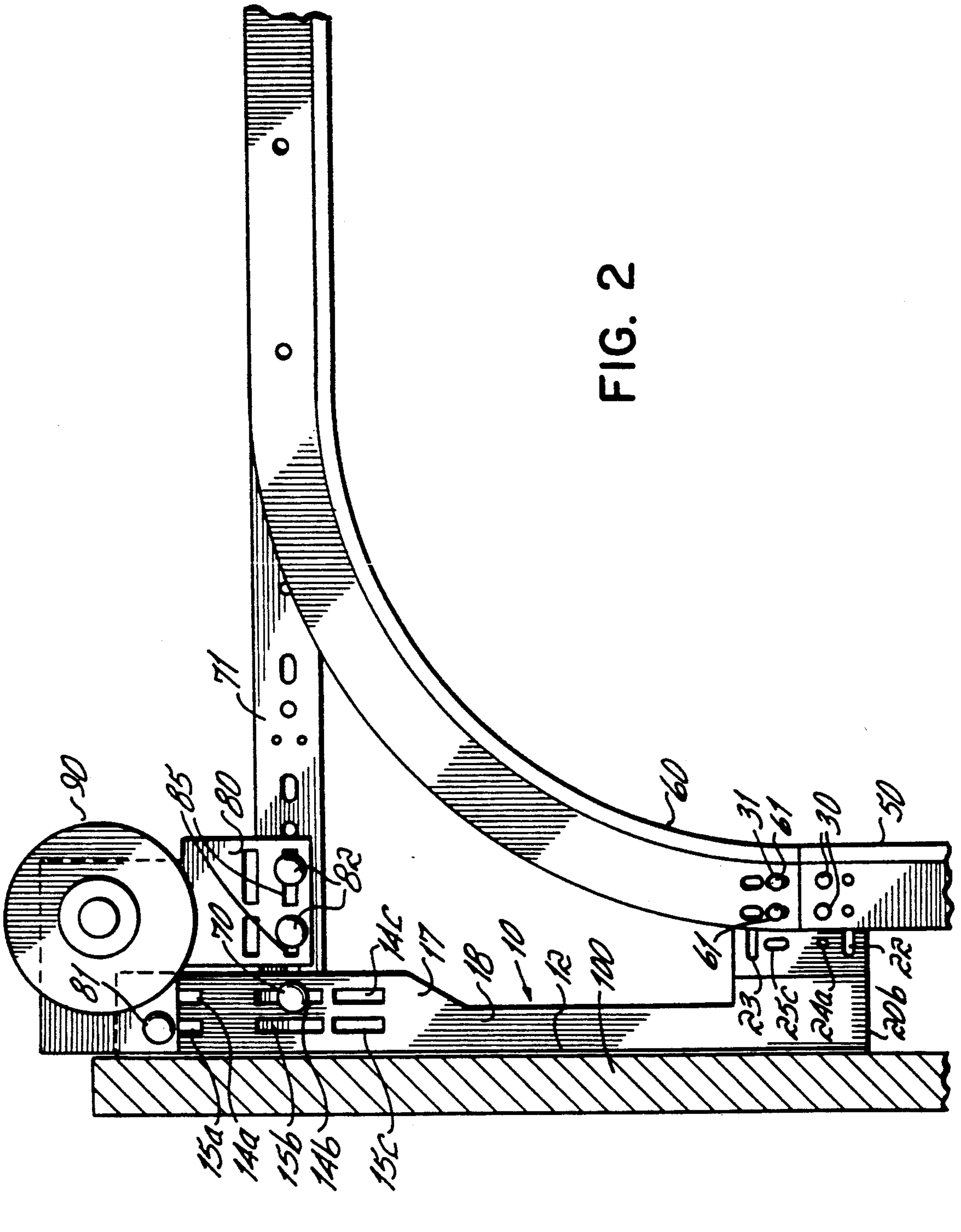
FIG. 2 is a schematic view showing the use of the angled flag bracket depicted in FIG. 1 in a sectional overhead torsion spring garage door system wherein the horizontal track has a radius of 12 inches and the door has a thickness of 2 inches.
Figure 3:
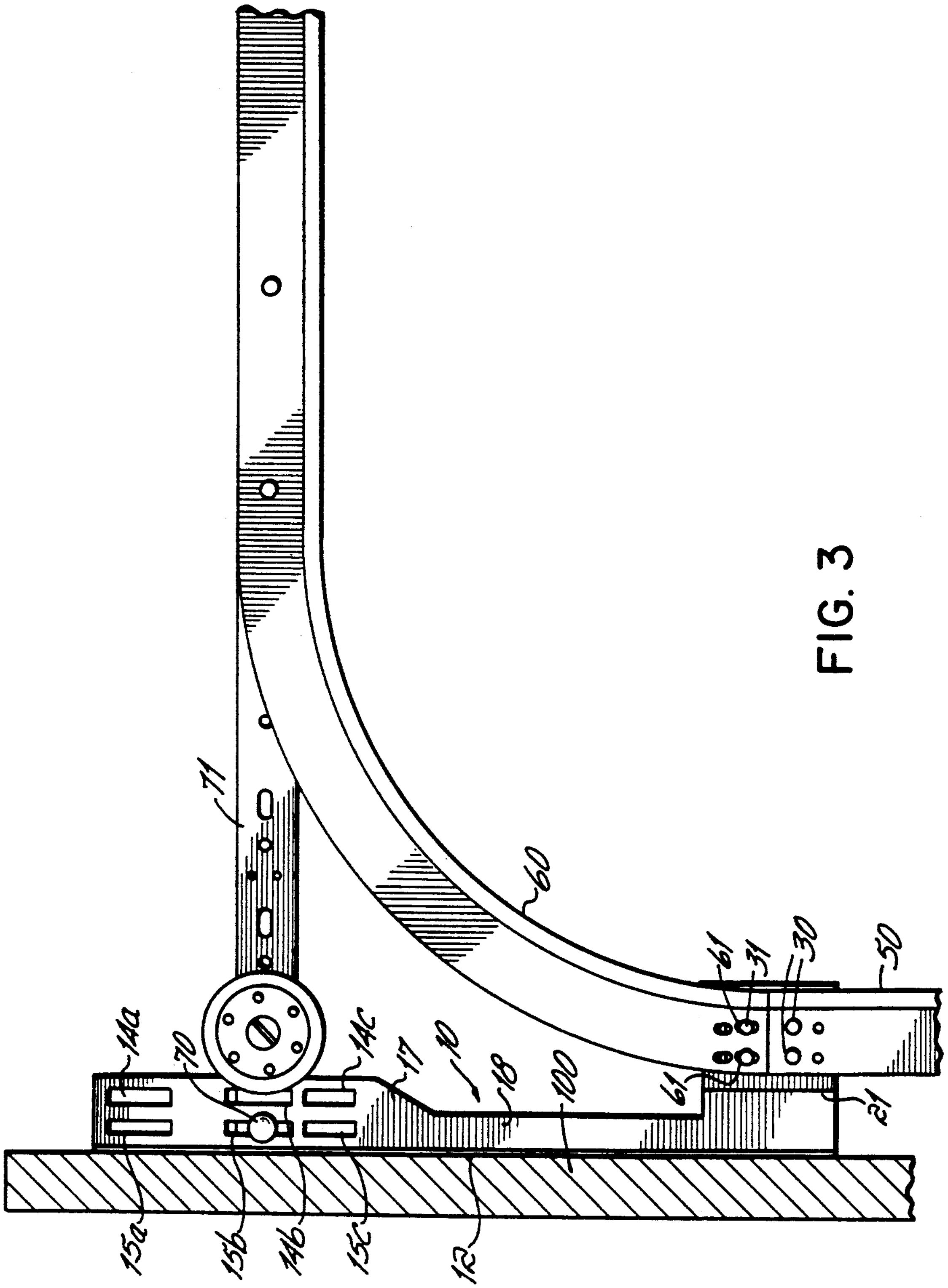
FIG. 3 is another schematic view showing the use of the universal angled flag bracket depicted in FIG. 1 in a sectional overhead extension spring garage door system wherein the horizontal track has a radius of 12 inches and the door has a thickness of $1\frac{3}{8}$ inches.

A bracket 10 is shown in FIGS. 1-3 and comprises a first rectangular-like plate portion 11 and a second rectangular plate portion 12 perpendicular thereto, which plate portions adjoin at juncture line 13 and form a ±90° angle. The first plate portion 11 has in a series a first set of preferably three large elongated rectangular through-hole slots **14*a*-14*c* and in series a second set of preferably three large elongated rectangular through-hole slots 15*a*-15*c*. For example, rectangular slots 14*a* and 15*a* are 1.625 inches in length, rectangular slots 14*b* and 15*b* are 1.688 inches in length, and rectangular slots 14*c* and 15*c* are 1.312 inches in length, whereas rectangular slots 14*a*-14*c* and 15*a*-15*c* are 0.390 inches in width. In addition, through-hole slots 14*a*-14*c* and 15*a*-15*c* are aligned parallel to each other and form three sets of two pairs of large elongated rectangular through-hole slots, as depicted in FIG. 1. The direction of elongation of the oval through-hole slots 14a–14c and 15a–15c in the first plate portion 11 is preferably parallel to juncture line 13 and the first and second plate portions 11 and 12, respectively. It should be appreciated that the three pairs of large elongated rectangular through-hole slots 14a–14c and 15a–15c add unique versatility to the angled flag brackets of the present invention by permitting each to be used with substantially all standard size tracks, such as those having 10 inch, 12 inch or 15 inch horizontal radiuses and adapted to receive 1$\frac{3}{8}$ inch, 1$\frac{3}{4}$ inch or 2 inch thick doors. For example, rectangular slots 14a and 15a are positioned for use with horizontal tracks having 15 inch radiuses, rectangular slots 14b and 15b are positioned for use with horizontal tracks having 12 inch radiuses, and rectangular slots 14c and 15c are positioned for use with horizontal tracks having 10 inch radiuses. It should be further appreciated that the large rectangular through-hole slots 14a–14c and 15a–15c** provide for horizontal and vertical adjustments of the horizontal tracks when assembling and installing same.

The second rectangular plate portion 12 has four smaller elongated oval through-hole slots 16a–16d, for example, 0.750 inches in length and 0.344 inches in width. The direction of the smaller elongated oval through-hole slots 16a–16d in the second plate portion 12 are preferably perpendicular to juncture line 13 in the first plate portion 11.

Other typical and preferred dimensions: lengths of plate portions 11 and 12 are 18.5 inches; width of plate portion 12 is 1.533 inches; and thicknesses of plate portions 11 and 12 are 0.086 inches. First plate portion 11 is provided with head member 17 which is 7 inches in length, neck member 18 which is 8.125 inches in length and tail member 19 which is 3.375 inches in length. The width of head member 17 is 1.875 inches, the width of neck member 18 is 1.019 inch, and the width of tail member 19 is 1.625 inches. Moreover, neck member 18 extends from head member 17 at a 37°16′01″ angle for a hypotenuse distance of 1.406 inches. The large elongated rectangular through-hole slots 14a and 15a are spaced 0.375 inches, rectangular slots 14b and 15b are spaced 3.250 inches, and rectangular slots 14c and 15c are spaced 5.188 inches from edge 17a of head member 17. Rectangular slots 15a–15c are spaced 0.487 inches between edge 17b and their imaginary axes whereas rectangular slots 14a–14c are spaced 1.187 inches between edge 17b and their imaginary axes. With respect to the smaller oval slots 16a–16d in second plate portion 10, the space between edges 12a and 12c and the imaginary axes of the oval slots 16a and 16d, respectively, is 0.750 inches, the space between edge 12a and the imaginary axes of oval slot 16b is 4 inches, and the space between edge 12a and the imaginary axes of oval 10c is 9.25 inches. Each space between edge 12d of second plate portion 12 and each imaginary axis of each slot 16a–16d is 0.422 inches.

The bracket 10 as illustrated in FIGS. 1–3 and in particular FIG. further includes a flag portion 20 preferably connected to first plate portion 11 at angle juncture 21 so that flag portion 10 is preferably off-set inwardly 0.093 inches from first plate portion 11. In other words, flag portion 20 is connected so that the first plate portion 11 preferably does not lie in the same plane as flag portion 20. By off-setting flag portion 20, it lies in the same plane as a horizontal angle used to connect the horizontal track to the angled flag bracket. This permits the track systems to be mounted to the angled flag brackets in a plumb or square or level relationship.

In addition, flag portion 20 runs perpendicular to juncture line 13 and to the second plate portion 12 so that the first plate portion 11 and flag portion 20 form an L- or flag-shaped bracket, as depicted in FIG. 1. Flag portion 20 also includes two large elongated oval slot through-holes 22 and 23, and three round through-holes 24a–24c. It should be further appreciated that while through-holes 24a–24c are round in shape and lie in a series perpendicular to juncture line 13, a single elongated oval or rectangular slot through-hole or the like may be substituted therefor. Moreover, if desired, the position of slot 22 and holes 24a–24c may be switched. Flag portion 20 further includes three smaller elongated oval slot through-holes 25a–25c preferably positioned between slot 23 and holes 24a–24c. The direction of elongation of the large through-hole oval slots 22 and 23 is preferably perpendicular to angle juncture 21 and juncture line 13. It should, of course, be understood that the relationship and position of slots 22, 23 and 25a–25c and holes 24a–24c are not critical. Therefore, they can be positioned in any desired arrangement and in any suitable size and shape so long as the objectives of the instant invention are not defeated.

Typical and preferred dimensions of flag portion 20: length of flag portion 20 is 3.375 inches; width of flag portion 20 is 2.625 inches; and thickness of flag portion 20 is 0.086 inches. Large oval slots 22 and 23 are 0.265 inches in width and are 2.078 inches in length. It is 0.1175 inches between edge 20a of flag portion 20 and ends 22a and 23a of oval slots 22 and 23, respectively, it is 0.469 inches between edge 20b and the imaginary axes of oval slot 22, and it is 0.469 inches between edge 20c and the imaginary axes of oval slot 23. As to holes 24a–24c, they have diameters of 0.265 inches, and it is 1.094 inches between edge 20b and their imaginary axes. It is 1.792 inches between edge 20a and the imaginary axes of hole 24a and oval slot 25a, it is 1.042 inches between edge 20a and the imaginary axes of hole 24b and oval slot 25b, and it is 0.292 inches between edge 20a and the imaginary axes of hole 24c and oval slot 25c. The lengths of oval slots 25a–25c are 0.625 inches whereas the widths of oval slots 25a–25c are 0.265 inches. It is 1.406 inches between edge 20c and the ends 25d–25f of slots 25a–25c.

In operation, in the embodiments of FIGS. 1–3, smaller oval slots 16 of second rectangular plate portion 12 permit bracket 10 to be mounted to, for example, wood door jambs 100 via fastener means, such as screws, bolts, nails or the like (not shown), in pre-drilled or pre-tapped holes in jambs 100. Initially, the fastener means utilized to mount brackets 10 to jambs 100 are loosely held. Fastener means 30, such as screws, rivets, bolts or the like, are positioned through holes (not shown) in vertical tracks 50 and through corresponding round holes 24a–24c to loosely connect flag portion 20 to vertical track 50, as shown in FIGS. 1–3. In FIG. 2, fastener means 30 are positioned through round holes 24b–24c whereas in FIG. 3, fastener means 30 are positioned through round holes 24a–24b. As further shown in FIGS. 1–3, fastener means 31, such as screws, rivets, bolts or the like, are positioned through holes 61 in horizontal tracks 60 to loosely connect horizontal tracks 60 to flag portion 20. In both FIGS. 2 and 3, horizontal tracks 60 have a 12 inch radius. However, vertical track 50 and horizontal track 60 in FIG. 2 are configured to accept a 2 inch thick door whereas vertical track 50 and horizontal track 60 in FIG. 3 are configured to accept a $1\frac{3}{8}$ inch thick door.

As can be further appreciated from FIGS. 1-3, large oval slots 22-23 of flag portion 20 permit horizontal adjustments to vertical tracks 50 and horizontal tracks 60 when connecting same to flag portion 20 of bracket 10. As can be further appreciated from FIGS. 1-3, smaller oval slots **25*a*-25*c* permit vertical tracks 50 and horizontal tracks 60 to be adjusted in the vertical direction when connecting same to flag portion 20. Thus, when vertical tracks 50 are loosely mounted to the flag portion 20 via fastening means 30 through holes 24*a*-24*c* and horizontal tracks 60 are loosely mounted to flag portion 20 via fastening means 31, oval slots 22-23 and oval slots 24*a*-24*c* are uniquely designed to cooperate so that vertical tracks 50 and horizontal tracks 60 can be adjusted in both the vertical and horizontal directions to account for imperfections in the manufacture of the vertical tracks 50 and horizontal tracks 60 and/or in the event the wood jambs 100 do not lie square, plumb or level. In other words, vertical tracks 50 and horizontal tracks 60 may be moved along the larger oval slots 22-23 and the smaller oval slots 25*a*-25*c* to adjust vertical tracks 50 and horizontal tracks 60 in both vertical and horizontal directions relative to flag portion 20** so that they will be plumb or level or square.

To further mount horizontal tracks 60 to bracket 10, fastener means 70, such as screws, rivets, bolts or the like, are positioned through one of the matching rectangular slots in first plate portion, such as through middle rectangular slot **14*b*, as depicted in FIG. 2, or through middle rectangular slot 15*b*, as depicted in FIG. 3, to loosely connect horizontal angles 71 mounted to horizontal tracks 60 to the angled flag brackets 10. Horizontal angles 71 can be moved along slots 14*b* and 15*b*, to adjust them horizontally and vertically relative to angled flag brackets 10 and wood jambs 100 so that vertical tracks 50 and horizontal tracks 60** are adjusted to be plumb or level or square.

As further shown in FIG. 2, end bearing plate 80, to which cable drum 90 is mounted, is loosely connected to angled flag bracket 10 by fastener means 81, such as a screw, rivet, bolt or the like, by inserting fastener means 81 through, for example, rectangular slot **15*a* of first plate portion 11. Rectangular slots 14*a* and 15*a* of first plate portion 11 permit end bearing plate 80 to be adjusted both vertically and horizontally when connecting end bearing plate 80 thereto so that it won't remain free-standing when door jamb 100 is too short, as shown in FIG. 2. Typically, door jambs are of proper size when horizontal tracks having 15 inch radiuses are selected. However, door jambs are sometimes too short in those situations when horizontal tracks having 10 inch or 12 inch radiuses are selected. In these instances, rectangular slots 14*a* and 15*a* permit the end bearing plates 80 of torsion spring systems to be mounted to the angled flag brackets 10 of the instant invention. In addition, fasteners 82 connecting end bearing plate 80 to horizontal angle 71 when loosened permit horizontal adjustment of end bearing plate 80 via the horizontal through-hole slots 85 in end bearing plate 80. Thus, once loosely assembled, fastener means 30, 31, 70, 81 and/or 82** can now be fully tightened.

If desired, vertical tracks 50 and horizontal tracks 60 may be readjusted by loosening either fastening means 30, 31, 70 and/or 81, moving the tracks, and then retightening the fastening means. Similarly, the vertical tracks 50 and horizontal tracks 60 may be readily disassembled and reassembled. Thus, it should be appreciated that representative uses of bracket 10 of this invention in an overhead garage door system are shown schematically in FIGS. 2 and 3.

It should be further appreciated that even when fastener means 30 are rivets permanently affixing angled flag brackets 10 to horizontal tracks 50 in advance prior to packaging, the end users at the time of assembly and installation can, if necessary, disconnect the rivets so that both horizontal and vertical adjustment of the angled flag brackets 10 and tracks 50 and 60 can be made. Horizontal tracks 50 can then be reconnected to the flag portions 20 of the angled flag brackets 10 via either horizontal slots 22 or round through-holes **24*a*, 24*b* and/or 24*c***.

It should therefore now be appreciated to those of skill in this art that, each angled flag bracket of the instant invention is universal in the sense that each is designed for use with substantially all standard size tracks for sectional overhead type garage door such as those designed to accept $1\frac{3}{8}$ inch, $1\frac{3}{4}$ inch and 2 inch doors and having 10 inch, 12 inch or 15 inch radiuses. Moreover, it should be appreciated that the angled flag brackets of the instant invention uniquely permit the tracks to be adjusted in both the vertical and horizontal directions during installation. Because of this unique versatility, the angled flag brackets of the present invention reduce the number of items manufacturers must carry in their inventories and package. Still further, it should be appreciated by those of skill in this art that the angled flag brackets of the instant invention are adapted to accept end bearing plates in torsion spring garage door systems when door jambs are too short so the end bearing plates do not have to remain free standing following installation.

The present invention may, of course, be carried out in other specific ways from those herein set forth without departing from the spirit and essential characteristics of the instant invention. For instance, the round holes or slots may be of different size and shape and spaced at different distances. For example, rectangular slots **14*a*-14*c* and 15*a*-15*c* may be formed as oval slots or as single long slots, respectively, whereas oval slots 16 may be formed as rectangular slots or round holes. Round holes 24*a*-24*b*** may be formed as a single large rectangular or oval slot or as three smaller rectangular or oval slots. Of course, the overall size and dimensions of the bracket as well as each portion, slot or hole thereof may be changed to any sufficient length, width, size or shape, so long as the objectives of the instant invention are not defeated. The present embodiments are, therefore, to be considered in all respects as illustrative and not restrictive and any changes coming within the meaning and equivalency range of the appended claims are to be embraced therein.

Having described our invention, we claim:

1. An angled flag shaped bracket formed as a one-piece unitary member for mounting tracks for sectional overhead doors to frames, said bracket comprises:

first and second plate portions, said first plate portion being perpendicular to said second plate portion to form an angle, said second plate portion being adapted to be fastened to a support;

a flag portion connected to said first plate portion, said flag portion being perpendicular to said second plate portion so that said first plate portion and said flag portion form an L-shape; and said first plate portion and said flag portion having means to permit horizontal and vertical tracks for a sectional overhead door to be adjusted in both vertical and horizontal directions when the tracks are connected to said first plate portion and said flag portion of said bracket, said first plate portion means including a plurality of slots to permit adjustment of the tracks having different horizontal track radii, said flag portion including a plurality of slots to permit adjustment of the tracks to accommodate different door thicknesses, said bracket thereby facilitating the assembly and installation of said tracks and sectional overhead doors to frames, said flag portion slots comprise two long through-hole slots spaced from one another and three short through-hole slots spaced from one another and between the two long through-hole slots on said flag portion, the two long through-hole slots run perpendicular to said second plate portion and the short through-hole slots run parallel to said second plate portion.

2. A bracket of claim 1, said first plate portion slots include three pairs of through-hole slots spaced apart from one another on said first plate portion, said three pairs of slots run parallel to said first and second plate portions.

3. A bracket of claim 1, said flag portion being connected to said first plate portion so that it is off-set with respect to said first portion.

4. A bracket of claim 1, said bracket including plate means to permit an end bearing plate to be connected thereto when horizontal and vertical tracks of an overhead door are mounted to a support which cannot be directly connected to the end bearing plate.

5. A bracket of claim 3, said plate means comprises a pair of elongated through-hole slots positioned on said first plate portion.

6. An angled flag shaped bracket formed as a one-piece unitary member for mounting tracks for sectional overhead doors to frames, said bracket comprises:

first and second plate portions, said first plate portion being perpendicular to said second plate portion to form an angle, said second plate portion being adapted to be fastened to a support;

a flag portion connected to said first plate portion, said flag portion being perpendicular to said second plate portion so that said first plate portion and said flag portion form an L-shape; and said first plate portion and said flag portion having means to permit horizontal and vertical tracks for a sectional overhead door to be adjusted in both vertical and horizontal directions when the tracks are connected to said first plate portion and said flag portion of said bracket, said first plate portion means includes in series three pairs of through-hole slots spaced apart from one another on said first plate portion, said three pairs of slots run parallel to said first and second plate portions to permit adjustment of the tracks having different horizontal track radii, said flag portion including a plurality of vertically and horizontally spaced slots to permit adjustment of the tracks to accommodate different door thicknesses, said bracket thereby facilitating the assembly and installation of said tracks and sectional overhead doors to frames.

* * * * *